(12) United States Patent
Barnat et al.

(10) Patent No.: US 8,973,264 B2
(45) Date of Patent: Mar. 10, 2015

(54) METHOD OF MACHINING A TURBINE DISK

(75) Inventors: Krzysztof Barnat, Berlin, CT (US);
Frank C. Mullett, Willington, CT (US)

(73) Assignee: United Technologies Corporation, Hartford, CT (US)

( * ) Notice: Subject to any disclaimer, the term of this patent is extended or adjusted under 35 U.S.C. 154(b) by 2351 days.

(21) Appl. No.: 11/953,928

(22) Filed: Dec. 11, 2007

(65) Prior Publication Data
US 2009/0148296 A1 Jun. 11, 2009

(51) Int. Cl.
*B21K 25/00* (2006.01)
*B23C 3/30* (2006.01)
*B23C 5/12* (2006.01)

(52) U.S. Cl.
CPC ... *B23C 3/30* (2013.01); *B23C 5/12* (2013.01); *B23C 2220/366* (2013.01)
USPC ....... 29/889.2; 29/889.23; 29/558; 416/219 R

(58) Field of Classification Search
CPC ......... B23P 15/00; B23P 15/006; B23C 3/18; F01D 5/3007; F01D 5/063; F01D 25/285
USPC .............. 29/889.2, 889.22, 889.23, 557, 558; 416/219 R; 409/64, 131, 244
See application file for complete search history.

(56) References Cited

U.S. PATENT DOCUMENTS

| | | | |
|---|---|---|---|
| 4,243,347 A | 1/1981 | Clapp et al. | |
| 4,827,675 A * | 5/1989 | Andrews | 451/28 |
| 4,914,872 A | 4/1990 | Snyder et al. | |
| 5,430,936 A | 7/1995 | Yazdzik, Jr. et al. | |
| 5,540,552 A | 7/1996 | Surdi | |
| 5,676,505 A | 10/1997 | Gauss et al. | |
| 5,931,616 A | 8/1999 | Daub | |
| 6,164,877 A | 12/2000 | Kamata et al. | |
| 6,322,296 B1 | 11/2001 | Wetli et al. | |
| 6,793,838 B2 | 9/2004 | Hansen et al. | |
| 6,883,234 B2 * | 4/2005 | Packman et al. | 29/889.2 |
| 6,893,195 B2 | 5/2005 | Wetli | |
| 6,968,721 B2 | 11/2005 | Tabuchi et al. | |
| 7,007,382 B2 * | 3/2006 | Mantel | 29/889.2 |
| 7,112,017 B2 | 9/2006 | Killer et al. | |
| 7,225,539 B2 | 6/2007 | Nowak et al. | |
| 7,699,685 B1 * | 4/2010 | Gerstner | 451/7 |
| 7,761,992 B2 * | 7/2010 | Packman et al. | 29/889.21 |
| 2003/0138301 A1 | 7/2003 | Kuerzel | |
| 2009/0214351 A1 * | 8/2009 | Guo | 416/219 R |
| 2011/0182685 A1 * | 7/2011 | Barnat | 409/131 |

OTHER PUBLICATIONS

Partial European Search Report for European Patent Application No. EP 08 25 3929 dated Apr. 7, 2009.

* cited by examiner

*Primary Examiner* — Ryan J Walters
(74) *Attorney, Agent, or Firm* — Carlson, Gaskey & Olds, P.C.

(57) ABSTRACT

A method of manufacturing a turbine disk involves machining to an initial form a slot in a turbine disk using a first cutting tool. An intermediate form is then machined using a second cutting tool different from the first cutting tool. A final form using a third cutting tool different from the first cutting tool and the second cutting tool is then machined.

18 Claims, 6 Drawing Sheets

METHOD OF MACHINING A TURBINE DISK

BACKGROUND OF THE INVENTION

This invention relates to a technique for machining a turbine disk for a gas turbine engine.

A turbine engine has a turbine disk to which are attached turbine blades. The turbine blades are seated in slots on the periphery of the turbine disk. Each slot has an interlocking shape to match a shape on a root of the turbine blade. The shape of the slot and the shape of the root may have a unique design for any particular turbine disk.

The turbine disk is typically manufactured by a broaching technique. This technique involves using a broach machine having long rails with cutting surfaces disposed on the rails. The cutting surfaces are run across the outside edge of the turbine disk to form each slot. Because of the numerous variations in slot designs, a rail used in the broach machine must be specially manufactured for each specific design. This process is both expensive and time consuming.

A need therefore exists for a technique to manufacture a turbine disk with slots in a more efficient and cheaper way.

SUMMARY OF THE INVENTION

The invention involves machining a turbine disk. First, the turbine disk is machined to an initial form using a first cutting tool. The slot is then machined to an intermediate form using a second cutting tool, which is different than the first cutting tool. Finally, a third cutting tool different from the first cutting tool and the second cutting tool is used to create the final form of the slot.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
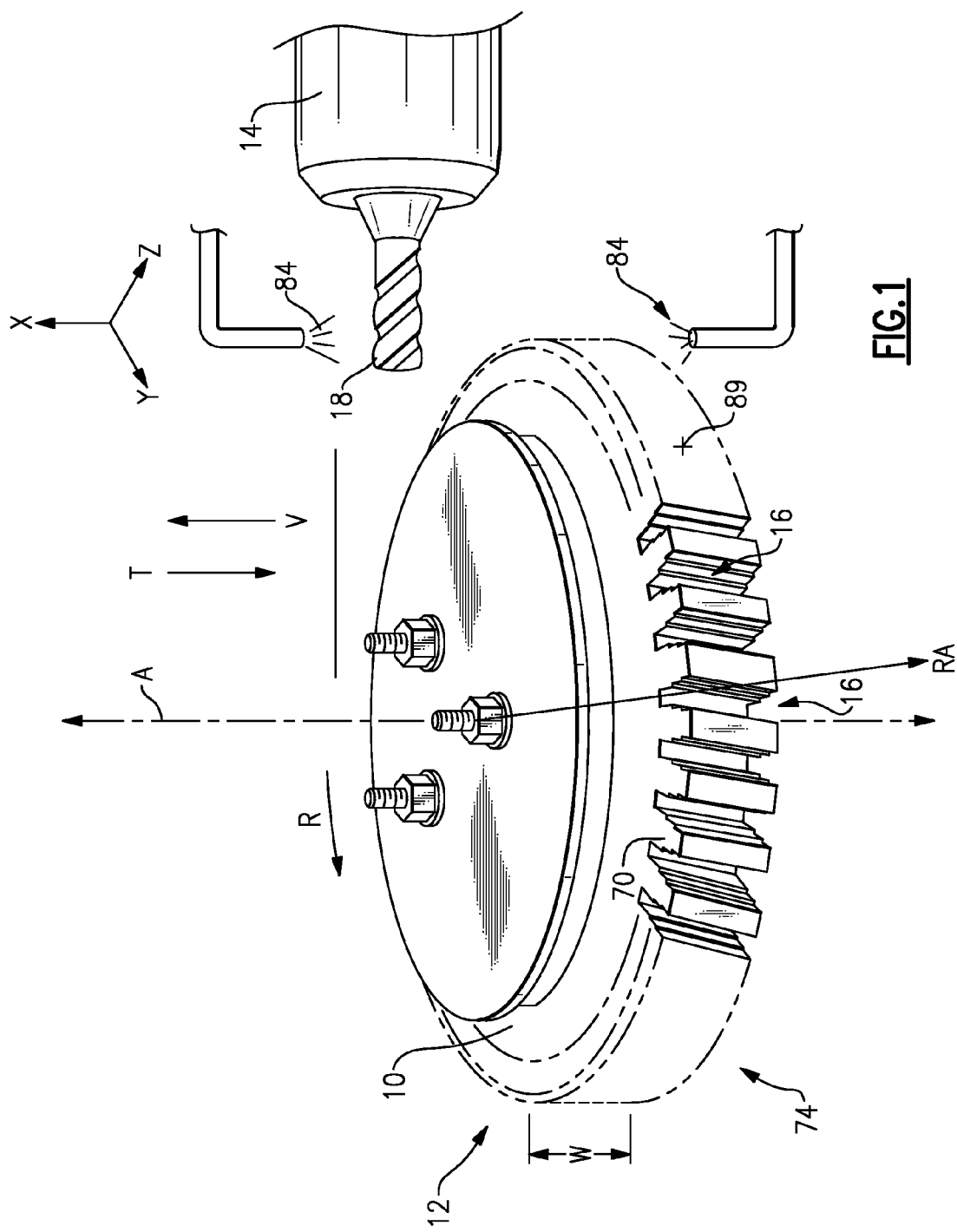
FIG. 1 illustrates a turbine disk being machined by a cutting tool.

With reference to FIG. 1, there is shown turbine disk 10 having circular body 12 with width W between first surface 70 and second surface 74. Turbine disk 10 is rotatable about axis A. Disposed on the periphery of circular body 12 are slots 16, which will hold an airfoil component 80, such as a turbine blade or vane.

In contrast to broaching, slots 16 of turbine disk 10 are created by machining, such as with milling machine 14. Milling machine 14 is shown here with cutting tool 18, although other cutting tools, such as cutting tool 22, cutting tool 26 and cutting tool 66 are interchangeable with cutting tool 18 in milling machine 14. Milling machine 14 is movable in three dimensions along axis X, Y and Z. During the machining process, cooling fluid 84 is used to cool and lubricate cutting tools. Turbine disk 10 is rotatable on a fixture in the direction of arrow R about axis A so that each slot 16 may be machined by milling machine 14.

Figure 2:
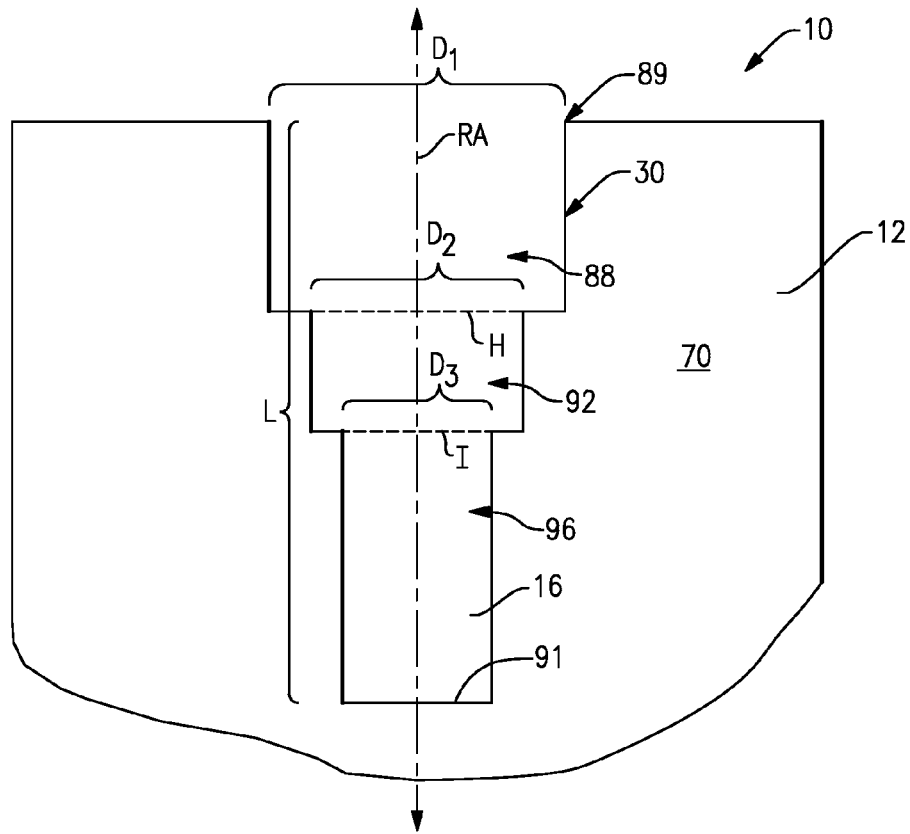
FIG. 2 illustrates the initial form created by a cutting tool.
Figure 3:
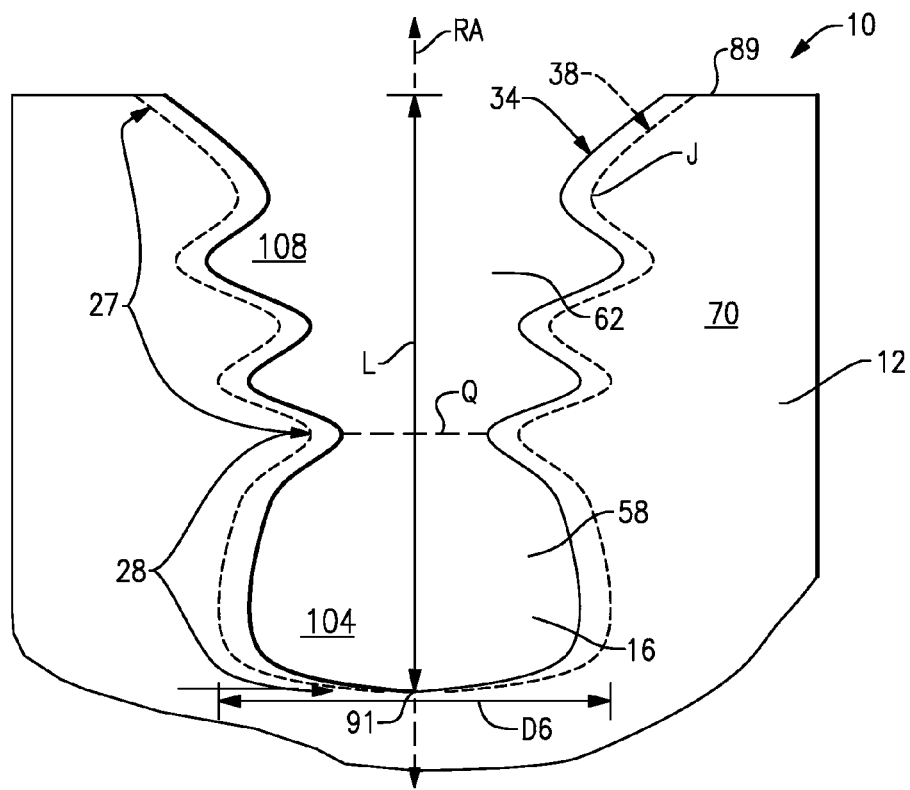
FIG. 3 illustrates a slot of the turbine disk in an intermediate form.
Figure 4:
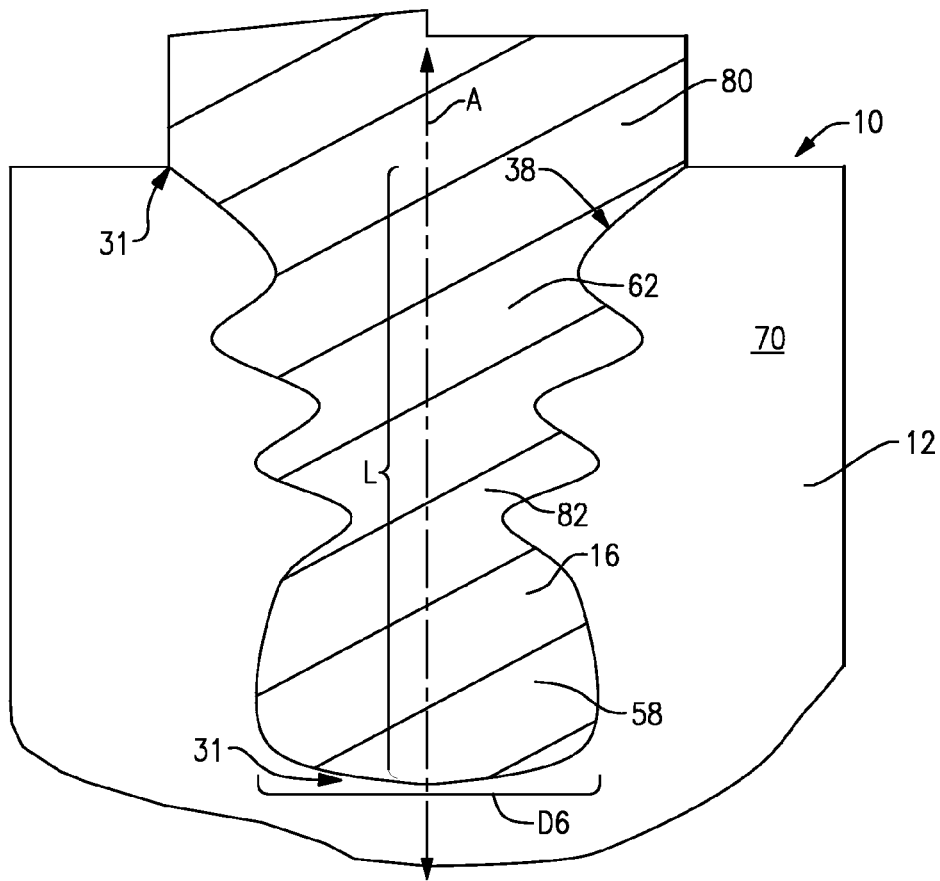
FIG. 4 illustrates the slot of the turbine disk in a final form with an airfoil component disposed in the slot.

Slot 16 is created by machining three forms: an initial form 30, such as shown in FIG. 2, an intermediate form 34, such as shown in FIG. 3 and a final form 38, such as shown in FIG. 4. Here, final form 38 is a unique tree shaped design. Initial form 30 may be a rough slot, intermediate form 34 may be a semi-finished slot, and final form 38 may be a finished slot. As will be explained, different cutting tools are used to create each form.

Figure 5:
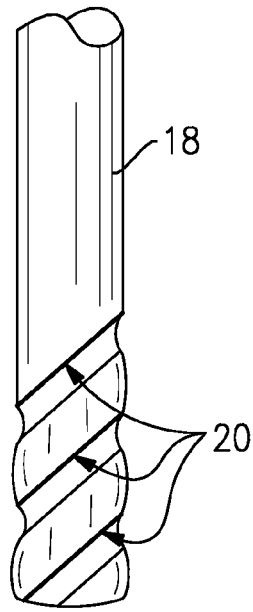
FIG. 5 illustrates a cutting tool that created the initial form of FIG. 2.

With reference to FIG. 2, slot 16 in circular body 12 of turbine disk 10 is created by using standard available straight diameter end mills, such as cutting tool 18 with cutting surfaces 20, shown in FIG. 5. In initial form 30, slot 16 has three parts: part 88 (from outer edge 89 of turbine disk 10 to dashed line H), part 92 (from dashed line H to dashed line I), and part 96 (from dashed line I to slot bottom 91).

Figure 9:
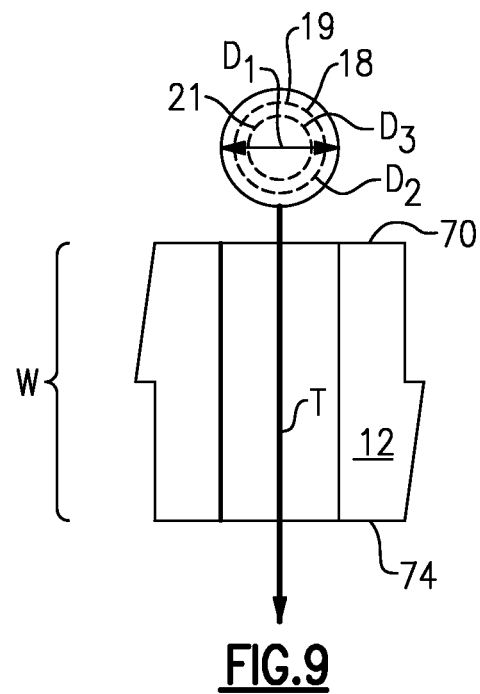
FIG. 9 illustrates the machining direction of the initial form of FIG. 2 and the intermediate form of FIG. 3.

Slot 16 is machined in three passes by milling machine 14, each pass forming each part 88, 92 and 96. As shown in FIG. 9, slot 16 is machined by machining through first surface 70 to second surface 74 in the direction of arrow T across width W of circular body 12. Cutting tool 18 having diameter DI is first used and creates first part 88 in one pass of milling machine 14.

Second part 92 is then created by replacing cutting tool 18 with a smaller straight diameter end mill, cutting tool 19, having diameter D2. Milling machine 14 is moved radially inward toward axis A and machines circular body 12 in one pass in the direction of arrow T to form part 92. Third part 96 is created using a smaller diameter end mill, cutting tool 21, having diameter D3. Milling machine 14 is moved radially inward toward axis A along one radial axis RA and moved in the direction of arrow T to machine circular body 12 in one pass to form part 96. In this way, initial form 30 may be created in a quick and efficient manner using standard diameter straight end mills. It should be appreciated that each slot 16 extends along a disk radial axis RA that is substantially perpendicular to axis A.

Figure 6:
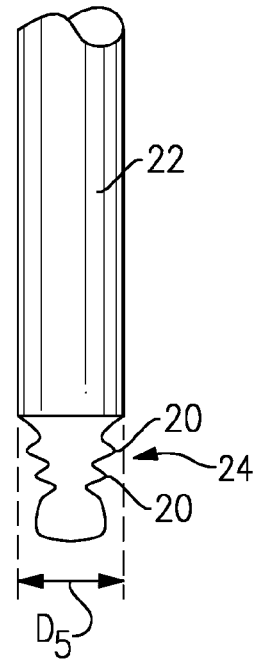
FIG. 6 illustrates a cutting tool used to create the intermediate form of FIG. 3.
Figure 7:
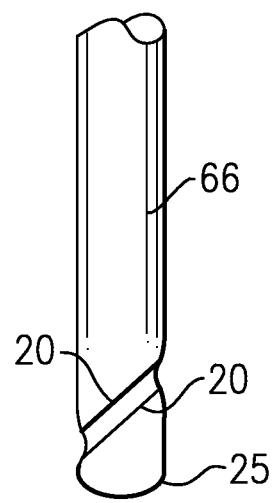
FIG. 7 illustrates another cutting tool used to create the intermediate form of FIG. 3.
Figure 8:
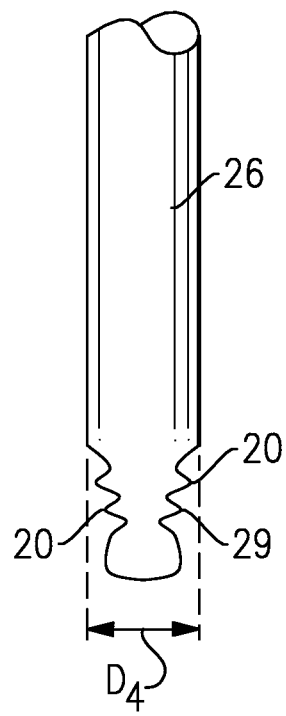
FIG. 8 illustrates a cutting tool used to create the slot in the final form of FIG. 4.

Following the creation of initial form 30, intermediate form 34 is created by machining slot 16 in two portions: first portion 62 (from outer edge 89 to dashed line Q) and second portion 58 (from dashed line Q to bottom 91). Rather than using standard end mills, specially formed cutting tools 22 and 66 are used by milling machine 14 to machine intermediate form 34. As shown in FIG. 6, cutting tool 22 has profile 24 shaped similar to one part, e.g., the first portion 62, of final form 38, and cutting tool 66 has a profile 25 shaped similar to the other part, e.g., the second portion 58, of final form 38.

With reference to FIG. 9, milling machine 14 creates first portion 62 by machining in one pass in the direction of arrow T using cutting tool 22. Cutting tool 22 is then replaced by cutting tool 66. Milling machine 14 is moved radially inward toward axis A and along radial axis RA and moved in the direction of arrow T to form the second portion 58 in one pass.

With reference to FIG. 3, cutting tool 22 having profile 24 creates first portion 62 having profile 27 while cutting tool 66 with profile 25 creates second portion 58 having profile 28, each profile substantially conforming to the profiles 24, 25 of the respective cutting tool 22 and cutting tool 66. By dividing the creation of intermediate form 34 into two portions using two tools 22, 66, milling machine 14 may create a finer finish than if a single tool were used to create intermediate form 34.

Figure 10:
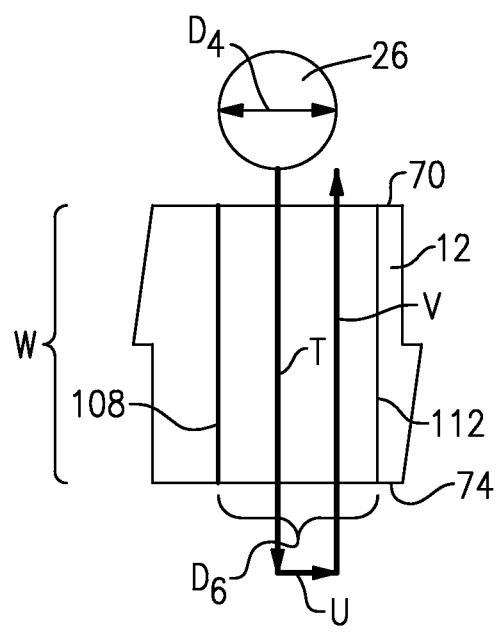
FIG. 10 illustrates the machining direction of the final form.

From intermediate form 34, final form 38, as delineated in FIG. 3 by dashed lines J and without dashed lines in FIG. 4, can be created by cutting tool 26, having a cutting surface with profile 29, similar to final form 38 as shown in FIG. 4. With reference to FIG. 10, cutting tool 26 having diameter $D_4$ is used to create final form 38 having diameter $D_6$. $D_4$ is less than $D_6$. Cutting tool 26 is brought across the width W of circular body 12 from first surface 70 to second surface 74 in the direction of arrow T to mill first side 108 and then moved in the direction of arrow U and then in the direction of arrow V to mill second side 112. In this way, profile 31 is created in final form 38 as shown in FIG. 4. By milling final form 38 with a cutting tool 26 having a smaller diameter $D_4$ than diameter $D_6$ of slot 16, cutting tool 26 will encounter less resistance from circular body 12 to create a smooth surface finish to first side 108 and second side 112. Following the creation of final form 38, airfoil component 80 having root 82 may be engaged with slot 16 in final form 38 as shown in FIG. 4.

Figure 11:
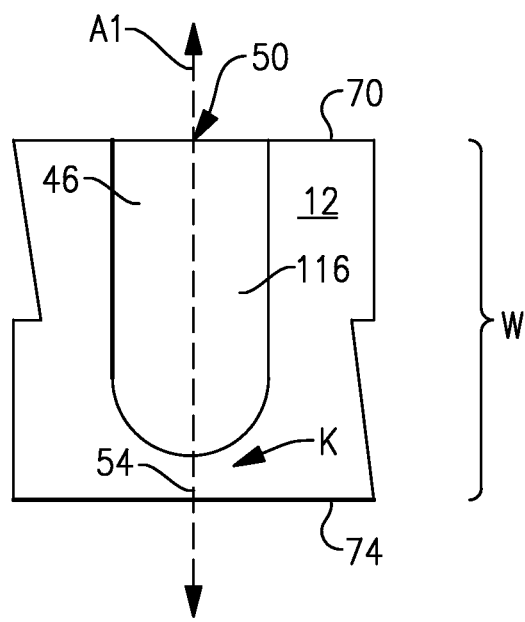
FIG. 11 illustrates a unique slot created by the inventive technique.

As a consequence of the exemplary inventive technique discussed above, slots having shapes not creatable by traditional broaching techniques may be made. For example, with reference to FIG. 11, slot 116 can be created by milling circular body 12 from first surface 70 to point K, a point short of second surface 74, along axis A1 that is substantially parallel to axis A. Slot 116 having opening 50 and ledge 54 is thereby created.

Figure 12:
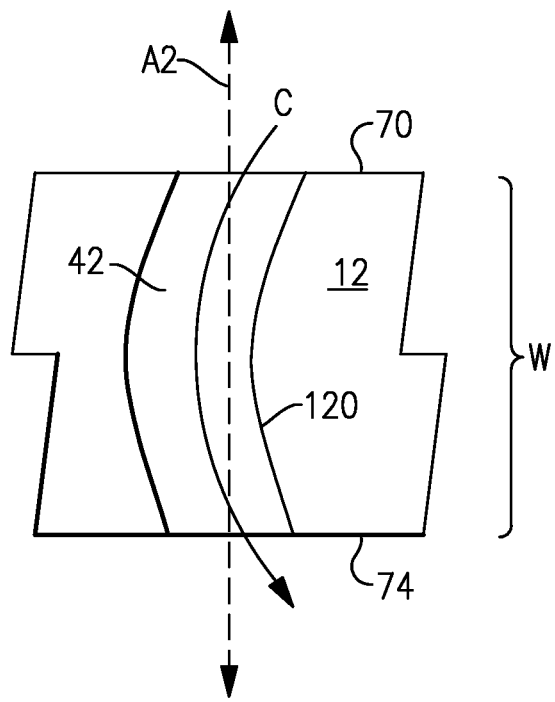
FIG. 12 illustrates another unique slot having a curved shape created by the inventive technique.

In addition, with reference to FIG. 12, milling machine 14 may mill across axis A2, which is substantially parallel to axis A, in a curved path C to form curved slot 42. Consequently, the inventive technique not only permits the more efficient formation of slots in a turbine disk but the creation of new designs for slots.

It should be appreciated to one of ordinary skill in the art that the cutting tools, 19, 22, 66, 26 may be moved in reversed direction of arrows T, U, V to create the initial form 30, the intermediate form 34, and final form 38 accordingly.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

We claim:

1. A method of manufacturing a turbine disk, comprising the steps of:
    a) machining a slot to an initial form in a turbine disk using a first end mill;
    b) machining the slot to an intermediate form using a second end mill different from the first end mill, at least one of the first end mill and the second end mill being configured with a flute that defines a cutting edge; and
    c) machining the slot to a final form using a third end mill different from the first end mill and the second end mill, the machining of the slot to the final form including moving the third end mill in a first direction to machine a first side of the slot of step b) and then moving the third end mill in a second direction, opposite the first direction, to machine a second side of the slot of step b).

2. The method of claim 1 further comprising forming a rough slot using the first end mill, forming a semi-finished slot using the second end mill, and forming a finished slot using the third end mill.

3. The method of claim 2 further comprising providing the third end mill having a smaller diameter than the second end mill.

4. The method of claim 1 further comprising defining the first direction and the second direction as directions substantially parallel to an axis of rotation of the turbine disk.

5. The method of claim 1 wherein the first end mill comprises a straight diameter end mill.

6. The method of claim 1 further comprising forming a profile of the intermediate form, the profile of the intermediate form conforming to a profile of the second end mill.

7. The method of claim 1 further comprising forming a profile of the final form, the profile of the final form conforming to a profile of the third end mill.

8. The method of claim 1, wherein the first side and the second side are opposed circumferential sides of the slot with regard to an axis of rotation of the turbine disk.

9. The method of claim 1, further comprising moving the third end mill in a circumferential direction with regard to an axis of rotation of the turbine disk between the moving of the third end mill in the first direction and the moving of the third end mill in the second direction.

10. The method of claim 1, wherein the third end mill has a smaller cutting diameter than the second end mill.

11. The method of claim 1, wherein the flute is helical.

12. The method of claim 1, wherein the flute and cutting edge extend to a free tip end of the at least one of the first end mill and the second end mill.

13. A method of manufacturing a turbine disk, comprising the steps of:
    a) machining a slot to an initial form in a turbine disk using a straight diameter end mill configured with a flute that defines a cutting edge, the straight diameter end mill creating a rough slot;
    b) machining the slot to an intermediate form using a second end mill different from the straight diameter end mill, the second cutting tool creating a semi-finished slot and having a profile similar to a profile of the intermediate form; and
    c) machining the slot to a final form using a third end mill different from the straight diameter end mill and the second end mill, the third end mill creating a finished slot and having a profile similar to a profile of the final form, the machining of the slot to the final form including moving the third end mill in a first direction to machine a first side of the slot of step b) and then moving the third end mill in a second direction, opposite the first direction, to machine a second side of the slot of step b).

14. The method of claim 13 further comprising providing the third end mill having a smaller diameter than the second end mill.

15. The method of claim 13 wherein the first side and the second side are opposed circumferential sides of the slot with regard to an axis of rotation of the turbine disk.

16. The method of claim 13 wherein the first direction and the second direction are parallel to an axis of rotation of the turbine disk.

17. The method of claim 13 further comprising moving the third end mill in a circumferential direction with regard to an axis of rotation of the turbine disk between the moving of the third end mill in the first direction and the moving of the third end mill in the second direction.

18. The method of claim 13 wherein the third end mill has a smaller cutting diameter than the second end mill.

* * * * *